United States Patent
Qiao et al.

(10) Patent No.: US 12,050,618 B2
(45) Date of Patent: Jul. 30, 2024

(54) UPGRADING REPLICATED DATABASES WITH SMALL DOWNTIME

(71) Applicant: salesforce.com, inc., San Francisco, CA (US)

(72) Inventors: Sheng Qiao, Fairfax, VA (US); Zhaohui George Yao, Leesburg, VA (US); Kim S. Lee, Atlanta, GA (US); Abhishek Chaturvedi, Pleasanton, CA (US); Jeff Zhu, Fairfax, VA (US); Mukesh Burgupalli, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 385 days.

(21) Appl. No.: 16/880,965

(22) Filed: May 21, 2020

(65) Prior Publication Data
US 2021/0286824 A1 Sep. 16, 2021

Related U.S. Application Data

(60) Provisional application No. 62/989,531, filed on Mar. 13, 2020.

(51) Int. Cl.
  *G06F 16/27* (2019.01)
  *G06F 3/06* (2006.01)
  *G06F 16/21* (2019.01)

(52) U.S. Cl.
  CPC ............ *G06F 16/27* (2019.01); *G06F 3/0607* (2013.01); *G06F 3/064* (2013.01); *G06F 3/065* (2013.01); *G06F 3/0683* (2013.01); *G06F 16/21* (2019.01)

(58) Field of Classification Search
  CPC ........ G06F 16/27; G06F 16/21; G06F 3/0607; G06F 3/064; G06F 3/065; G06F 3/0683
  See application file for complete search history.

(56) References Cited

U.S. PATENT DOCUMENTS

| | | | |
|---|---|---|---|
| 8,335,765 B2 * | 12/2012 | Sivasubramanian | G06F 11/2076 707/639 |
| 9,213,728 B2 * | 12/2015 | Engelko | G06F 16/23 |
| 9,626,390 B2 * | 4/2017 | Bentzien | G06F 16/27 |
| 10,585,766 B2 * | 3/2020 | Taranov | G06F 11/2097 |
| 11,194,501 B2 * | 12/2021 | Wittig | G06F 3/0617 |
| 11,232,126 B2 * | 1/2022 | Meissner | G06F 8/65 |

OTHER PUBLICATIONS

Anonymous et al. (ip.com, Pub. Date, Jan. 9, 2012) (Year: 2012).*

(Continued)

*Primary Examiner* — Irete F Ehichioya
*Assistant Examiner* — Ken Hoang

(57) ABSTRACT

An online system performs upgrades of replicated databases. The online system stores data in a primary site and a secondary site. The primary site comprising databases used to process client requests and a secondary site comprising databases used as standby. The online system upgrades databases of both sites by upgrading the secondary site, switching client requests to the secondary site while using the databases of primary site as standby databases. The online system then upgrades the primary site. The process allows the online system to upgrade databases with small down time.

18 Claims, 16 Drawing Sheets

(56) References Cited

OTHER PUBLICATIONS

Oracle, "Oracle Data Guard: Concepts and Administration," Aug. 2008, pp. 1-386.
Oracle, "Oracle Database: Advanced Application Developer's Guide," Aug. 2008, pp. 1-520.
Oracle, "Oracle GoldenGate: Administering Oracle GoldenGate for Windows and UNIX," Nov. 2014, pp. 1-388.

* cited by examiner

UPGRADING REPLICATED DATABASES WITH SMALL DOWNTIME

CROSS REFERENCE TO RELATED APPLICATIONS

This application claims a benefit of U.S. Patent Application Ser. No. 62/989,531, filed Mar. 13, 2020, the contents of which are incorporated by reference herein.

BACKGROUND

Field of Art

This disclosure relates in general to replicated databases used by online systems such as multi-tenant systems and in particular to performing upgrade of replicated databases used by the online system with small downtime of the online system.

Description of the Related Art

Online systems typically store data in a database, for example, user information, information describing different types of objects, information describing activities such as online transactions performed by the online system. The amount of data stored in a database of an online system can be several terabytes. Online system such as multi-tenant systems store data of multiple enterprises in a database or in multiple databases. Accordingly, the amount of data stored in a database can be several hundred terabytes. Furthermore, the multi-tenant system may store data in several databases, each database storing data of multiple tenants of the multi-tenant system. Online systems often use database replication to store copies of the same data. For example, each database maybe replicated to store the data in multiple databases for supporting disaster recovery or for performing backup and restore operations.

An online system may have to perform upgrades of their databases. This may be required, for example, if the database vendor ships a newer version that supports new features, security fixes, reduced bugs, improved performance, and so on. Upgrading such large databases can take several hours and even days. If the online system encounters certain issues during the upgrade, for example, unexpected defects in the code, the delay caused by the upgrade can be significantly larger, for example, several days or weeks. A multi-tenant system can perform several thousand database transactions per second and over a billion transactions in a day. If the database is not available for several hours or days, users are unable to perform these transactions. Such large amount of downtime is unacceptable for several applications.

Figure 1:
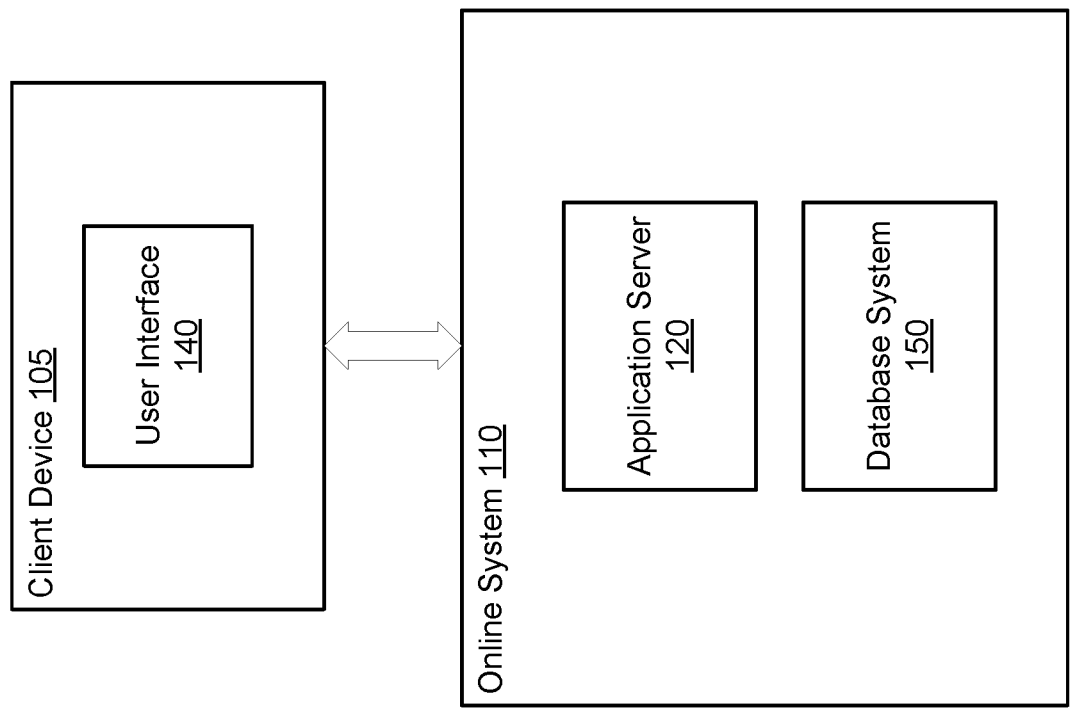
FIG. 1 is a block diagram of a system environment 100 illustrating use of an online system that uses a database, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

An online system performs upgrades of replicated databases with small downtime. Embodiments of the invention perform database upgrades with downtime reduced to few minutes when the client requests are redirected from one database to another database. This is a significant improvement compared to conventional techniques that cause the database to be down during the entire duration of the database upgrade that can be several hours or days. Accordingly, embodiments of the invention increase availability of databases during an upgrade process.

According to an embodiment, the online system stores data in (1) a primary site comprising a primary set of databases processing client requests, and (2) a secondary site comprising a secondary set of databases used as standby databases. The online system; receives a request to upgrade databases of both sites to a new version. The online system upgrades the secondary site, switches client requests to the secondary set of databases using the primary set of databases as standby databases, and then upgrades the primary site.

The online system upgrades the secondary site as follows. The online system identifies a database (D1) of the secondary site for upgrading and restores the first database to a target state T1. The online system records changes to a database (Dp) of the primary set starting from a state corresponding to the target state T1. The online system upgrades the database D1 and applies the recorded changes of the database Dp to the upgraded database D1.

The online system upgrades the primary site as follows. The online system identifies a database (D2) of the primary site for upgrading. The online system restores the database D2 to a second target state. The online system records changes to a database (Ds) of the secondary site starting from a state corresponding to the second target state T2. The online system upgrades the database D2 and applies the recorded changes of the database Ds to the upgraded database D2.

In an embodiment, responsive to switching client requests to the secondary set of databases, client request are directed to a secondary database of the secondary set of databases. Accordingly, changes to the secondary database are replicated to a database of the primary set of databases using a logical replication platform.

In an embodiment, before upgrading database of the secondary set of databases, client request are directed to a primary database of the primary set of databases and changes to the primary database are replicated to a database of the secondary set of databases using physical replication that performs storage block level replication.

In an embodiment, after upgrading database of the secondary site, client request are directed to a secondary database and changes to the secondary database are replicated to a database of the primary set of databases using physical replication.

In an embodiment, the primary set of databases further includes an alternate primary database and the secondary set of databases further includes an alternate secondary database, wherein replication is used to copy data across databases within each set of databases.

In an embodiment, the set of databases of the secondary site comprises a plurality of databases. After upgrading the secondary database to the new version, the online system upgrades one or more other databases from the set of databases of the secondary site to the new version. Switching client requests to the secondary set of databases comprises directing the requests to one of the upgraded databases from the set of databases of the secondary site.

In an embodiment, the online system is a multi-tenant system and each database from the primary and secondary sets of databases stores data of a plurality of tenants.

Overall System Environment

FIG. 1 is a block diagram of a system environment 100 illustrating use of an online system that uses a database, according to one embodiment. The system environment 100 comprises an online system 110 and one or more client devices 105. In other embodiments, the system environment 100 may include other more or fewer components, for example, there may be third party systems that interact with the online system 110.

The online system 110 comprises one or more application servers 120 and a database system 150. The online system 110 may include other modules than those shown in FIG. 1. Functionality indicated as being performed by a particular module as described herein may be performed by other modules. The application servers 120 comprises instructions for various applications executing on the online system 110 that users can access via client devices 105.

In some embodiments, the online system 110 is a multi-tenant system. Each tenant may be an enterprise. Each tenant may represent a customer of the multi-tenant system that has multiple users that interact with the multi-tenant system via client devices 105.

A multi-tenant system stores data for multiple tenants in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system may execute an application server that simultaneously processes requests for a number of tenants. However, the multi-tenant system enforces tenant-level data isolation to ensure that jobs of one tenant do not access data of other tenants.

Figure 2:
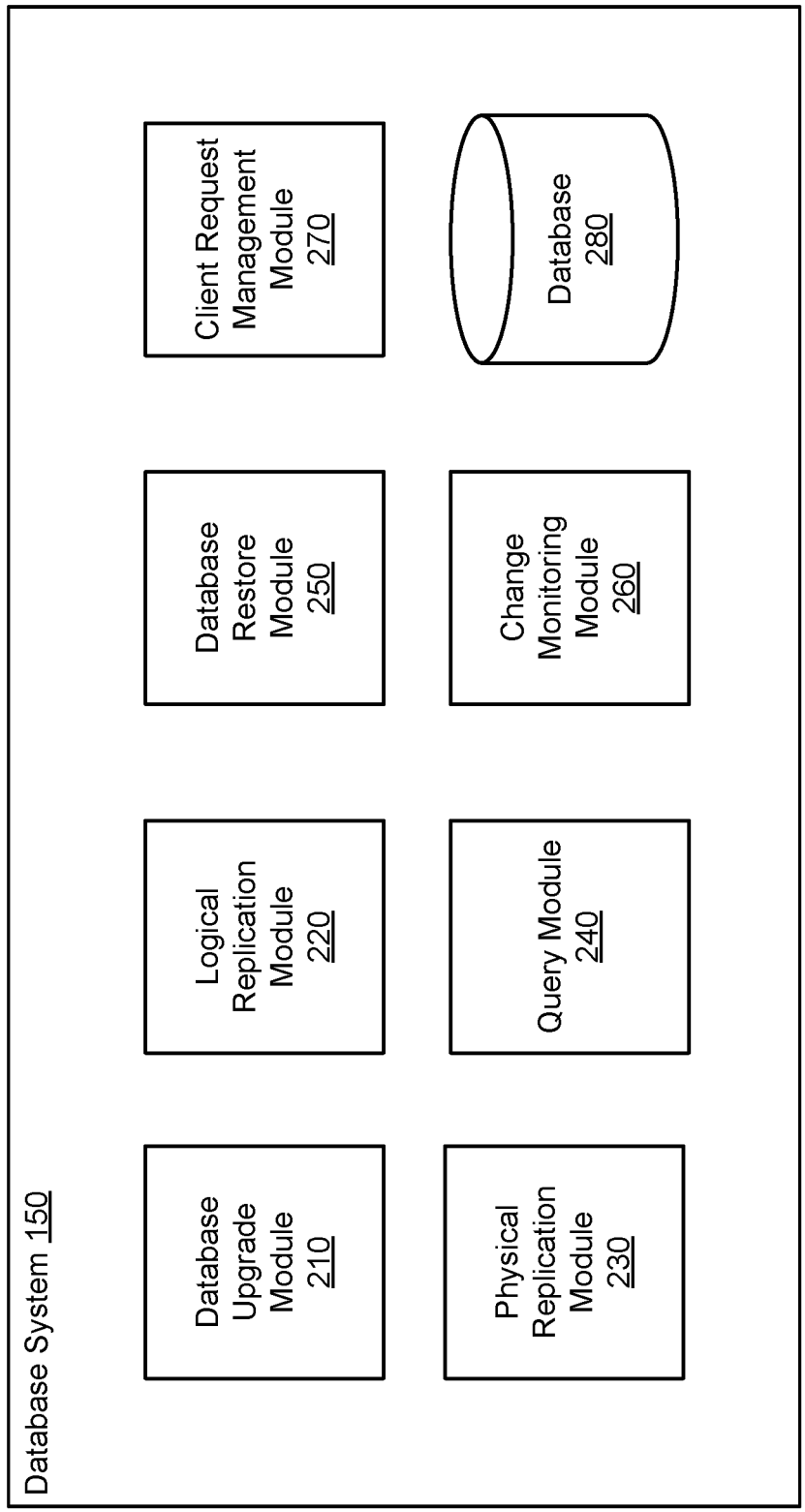
FIG. 2 is a block diagram illustrating architecture of a database system, according to one embodiment.

The database system 150 manages data that is processed by the online system 110. In embodiments where the online system is a multi-tenant system, the database system 150 stores data for various tenants of the multi-tenant system. The database system 150 may store data for different tenants in separate physical structures, for example, separate database tables or separate databases. Alternatively, the database system 150 may store data of multiple tenants in a shared structure. For example, user accounts for all tenants may share the same database table. However, the multi-tenant system stores additional information to logically separate data of different tenants. The details of the database system 150 are shown in FIG. 2 and described in connection with FIG. 2

In one embodiment, the online system 110 is a multi-tenant system that implements a web-based customer relationship management (CRM) system and the application server 120 provides users access to applications configured to implement and execute CRM software applications.

The client device 105 comprises a user interface 140 that may be provided by an application executing on the client device 105, for example, a browser application. A user may use the user interface 140 to interact with the online system 110. For example, the user may execute an application in connection with an interaction with one or more other users to complete a transaction.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the system architecture and the processes described herein are illustrated using a multi-tenant system, the techniques disclosed are not limited to multi-tenant systems but can be executed by any online system, for example, an online system used by a single enterprise.

System Architecture

The database system 150 may store data on multiple databases that are stored in one site of different sites. A site may refer to a physical location in which computing resources are kept. For example, a site may be a data center comprising hardware including processors and storage devices.

FIG. 2 is a block diagram illustrating architecture of a database system, according to one embodiment. The database system 150 comprises a database upgrade module 210, a logical replication module 220, a physical replication module 230, a query module 240, a database restore module 250, a change monitoring module 260, a client request management module 270, and a database 280. Other embodiments can have different and/or other components than the ones described here, and the functionalities can be distributed among the components in a different manner.

The database 280 stores data and allows users to perform queries that may access data as well as modify the data. For example, the database 280 may store records comprising fields and a query may insert new records, update existing records, and delete records. A query may request fields of records. The database is typically replicated. For a multi-tenant system, the database 280 may store data for multiple enterprises, each enterprise representing a tenant of the multi-tenant system.

The query module 240 processes user queries to process data stored in database 280. In an embodiment, the query module 240 processes queries in a particular query language, for example, structured query language (SQL). A query may be used to perform an action using the database, for example, update a record, add new record, or delete a record. The query may be used to access information, for example, values stored in one or more records.

The database upgrade module 210 performs upgrades of database 280. The upgrade of a database upgrades both the instructions executed for processing data of the database as well as the data stored in the database. The instructions of the database may be stored as libraries of executable instructions, for example, binary files. As an example, the database 280 may have a version V1 and the database upgrade module 210 upgrades the database 280 to a newer version V2. An upgrade may update one or more libraries storing instructions of the database, for example, to add new features or to fix certain known defects in the instructions.

The physical replication module 230 performs replication by copying storage blocks. The physical replication module 230 performs replication of data from a source database to a target database. Accordingly, if there are changes in the storage blocks of the source database, the physical replication module 230 propagates the changes to the target database by sending information describing the storage blocks that changed. The physical replication is performed only if the source database and the target database have the same version. Physical replication cannot be performed across two databases having different versions.

The logical replication module 220 performs logical replication from a source database to a target database. The logical replication module 220 identifies high level operations performed in the source database and performs the same operations in the target database. For example, if a transaction is performed in the source database that updates a set of records, the logical replication module 220 performs the same transaction in the target database, thereby causing the corresponding sets of records of the target database to be updated. In an embodiment, the logical replication module 220 identifies query statements corresponding to the changes performed on the source database and executes the same query statements on the target database.

The database restore module 250 restores the database to a particular state. In an embodiment, the database system 150 identifies a state of the database by a system change number and provides the system change number as input to the database restore module 250. The database restore module 250 modifies the state of the database so that the state of the database is restored to the input state corresponding to the system change number.

The change monitoring module 260 monitors changes performed in a source database and stores information describing these changes. The database system 150 can apply the stored information describing the changes to a target database. In an embodiment, the information describing changes to a source database are represented as change logs.

The client request management module 270 directs requests received from client devices of users to a database for processing. In an embodiment, the client request management module 270 directs the requests to a particular site storing a set of databases. One of the database from the set is used for processing the requests and one or more other databases may be used as standby databases. A standby database does not process client requests directly but receives changes performed by a database that does process client requests. Accordingly, data of the standby database is kept in sync with the database that processes client requests. The standby database may be used for processing client requests if necessary, for example, if a failure occurs in the database that is currently processing client requests.

Replicated Database Configurations

Figure 3:
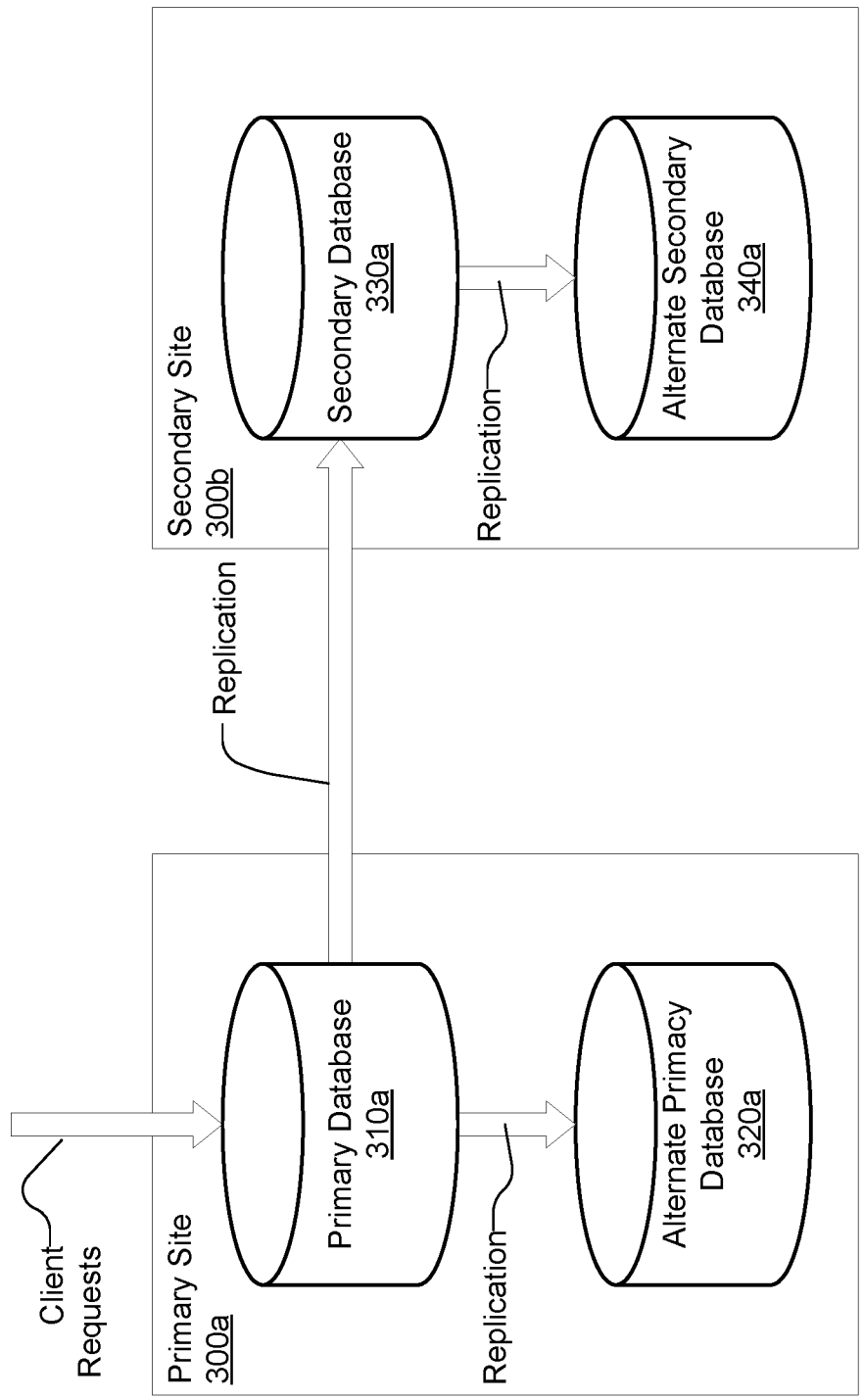
FIG. 3 is a block diagram illustrating architecture of a database replicated across multiple sites, according to one embodiment.

FIG. 3 is a block diagram illustrating architecture of a database replicated across multiple sites, according to one embodiment. FIG. 3 shows two sites, a primary site 300a and a secondary site 300b. Each site may be a data center having a physical location on which computing resources are located for storing one or more databases. The primary site 300a comprises a primary database 310a and an alternate primary database 320a. The data of the primary database 310a is replicated to the alternate primary database 320a. The secondary site 300b comprises a secondary database 330a and an alternate secondary database 340a. The data of the secondary database 330a is replicated to the alternate secondary database 340a. The client requests are directed by the client request management module 270 to the primary site 300a. In particular, the client request management module 270 directs client requests to the primary database 310a. The data of the primary database 310a is replicated to the secondary database 330a.

In an embodiment, the alternate primary database uses less powerful hardware compared to the primary database. Accordingly, the client requests are processed by the primary database and the alternate primary database is used for performing tasks other than processing of client requests, such as backups. Similarly, the alternate secondary database uses less powerful hardware compared to the secondary database. Accordingly, if the secondary site is used for processing client requests, the client requests are processed by the secondary database and the alternate secondary database is used for performing tasks other than processing of client requests, such as backups.

Figure 4:
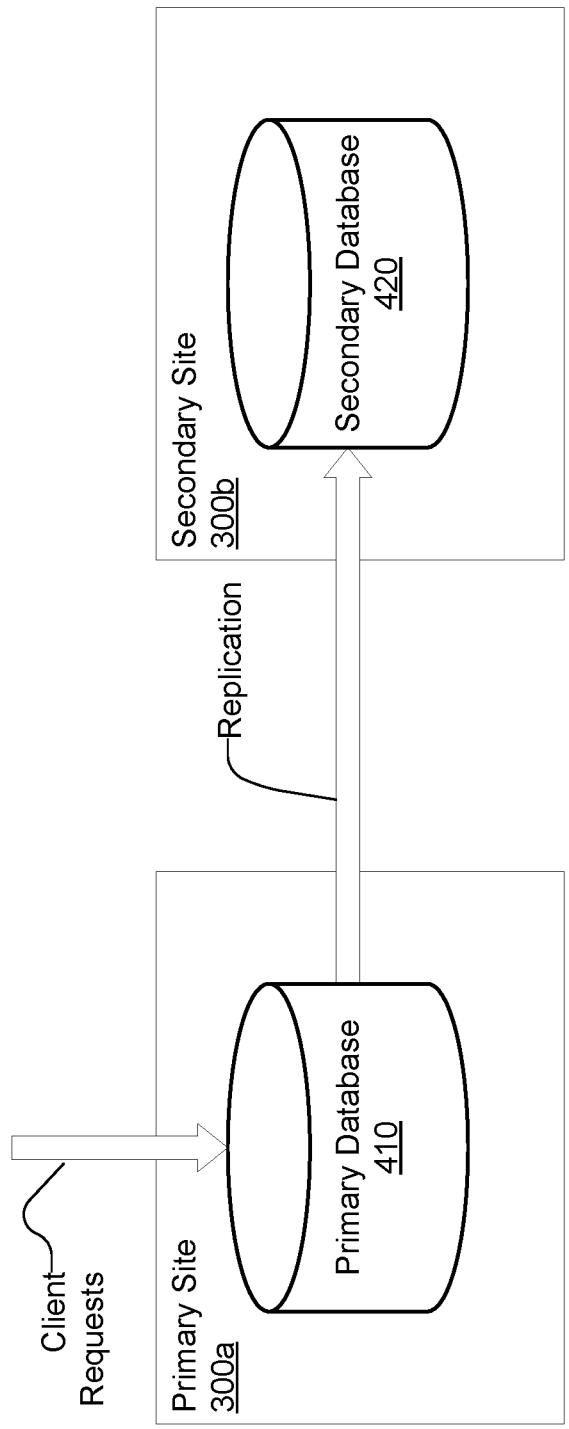
FIG. 4 is a block diagram illustrating architecture of a database replicated across multiple sites, according to another embodiment.

FIG. 4 is a block diagram illustrating architecture of a database replicated across multiple sites, according to another embodiment. FIG. 4 also shows two sites, a primary site 300a and a secondary site 300b. The primary site 300a comprises a primary database 410a and the secondary site 300b comprises a secondary database 420a. The client requests are directed by the client request management module 270 to the primary site 300a. In particular, the client request management module 270 directs client requests to the primary database 310a. The data of the primary database 410a is replicated to the secondary database 420a.

Processes

FIGS. 5-8 show various flowcharts illustrating processes executed by the database system 150. Various embodiments can perform the steps of the processes in different orders than those indicated herein. Moreover, other embodiments can include different and/or additional steps than the ones described herein.

Figure 5:
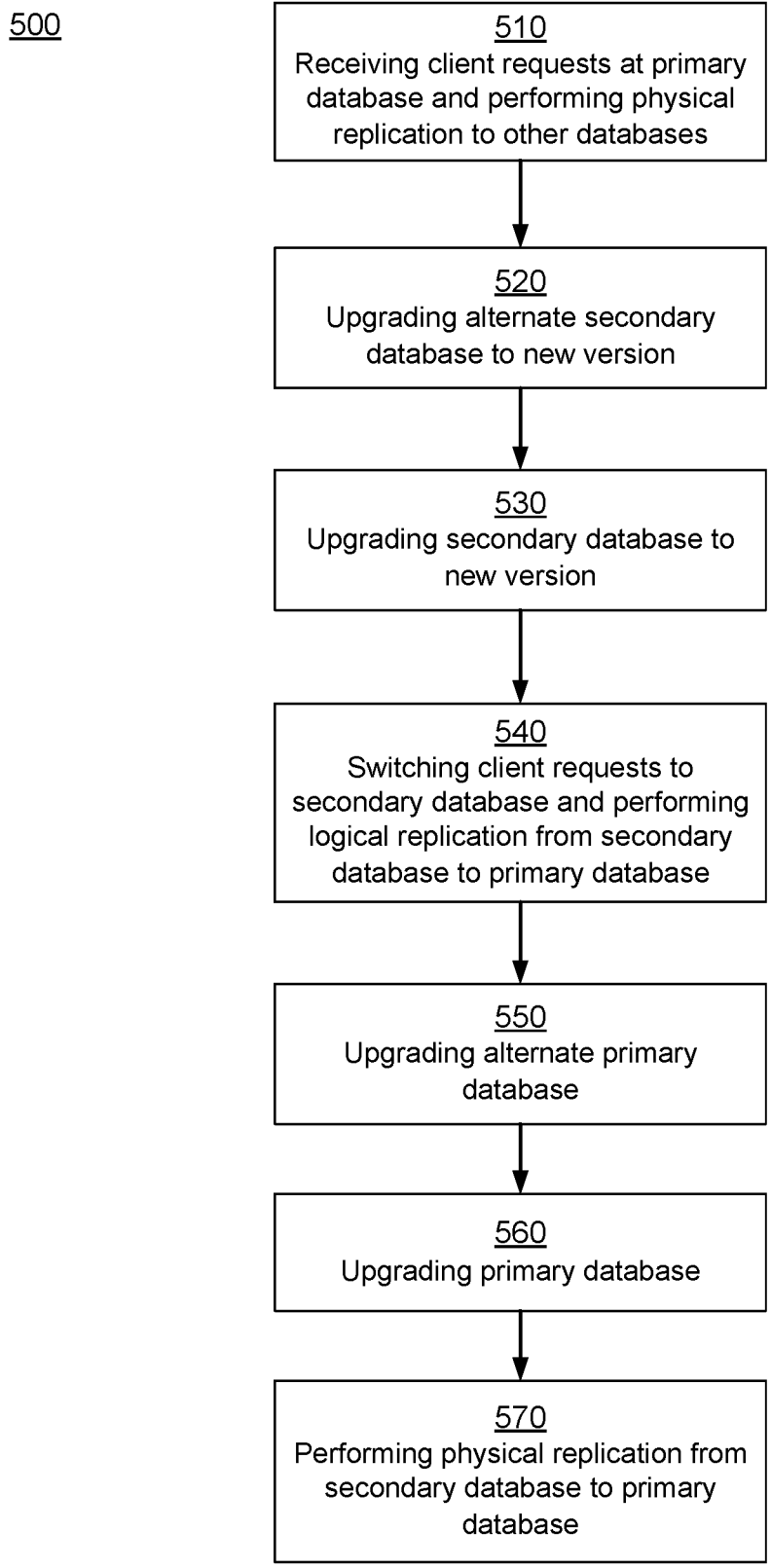
FIG. 5 is a flow chart illustrating the process for performing a database upgrade for the online system, according to one embodiment.

FIG. 5 is a flow chart illustrating the process for performing a database upgrade for the online system, according to one embodiment. The process applies to the replicated database configuration illustrated in FIG. 3 but can be applied to other configurations as well, for example, a database configuration in which there are more than two replicated databases corresponding to each database at each site. FIG. 7A-H illustrate various steps of a database upgrade for an online system, according to one embodiment. The steps of the flowchart of FIG. 5 are illustrated using the steps shown in FIGS. 7A-H.

Figure 7A:
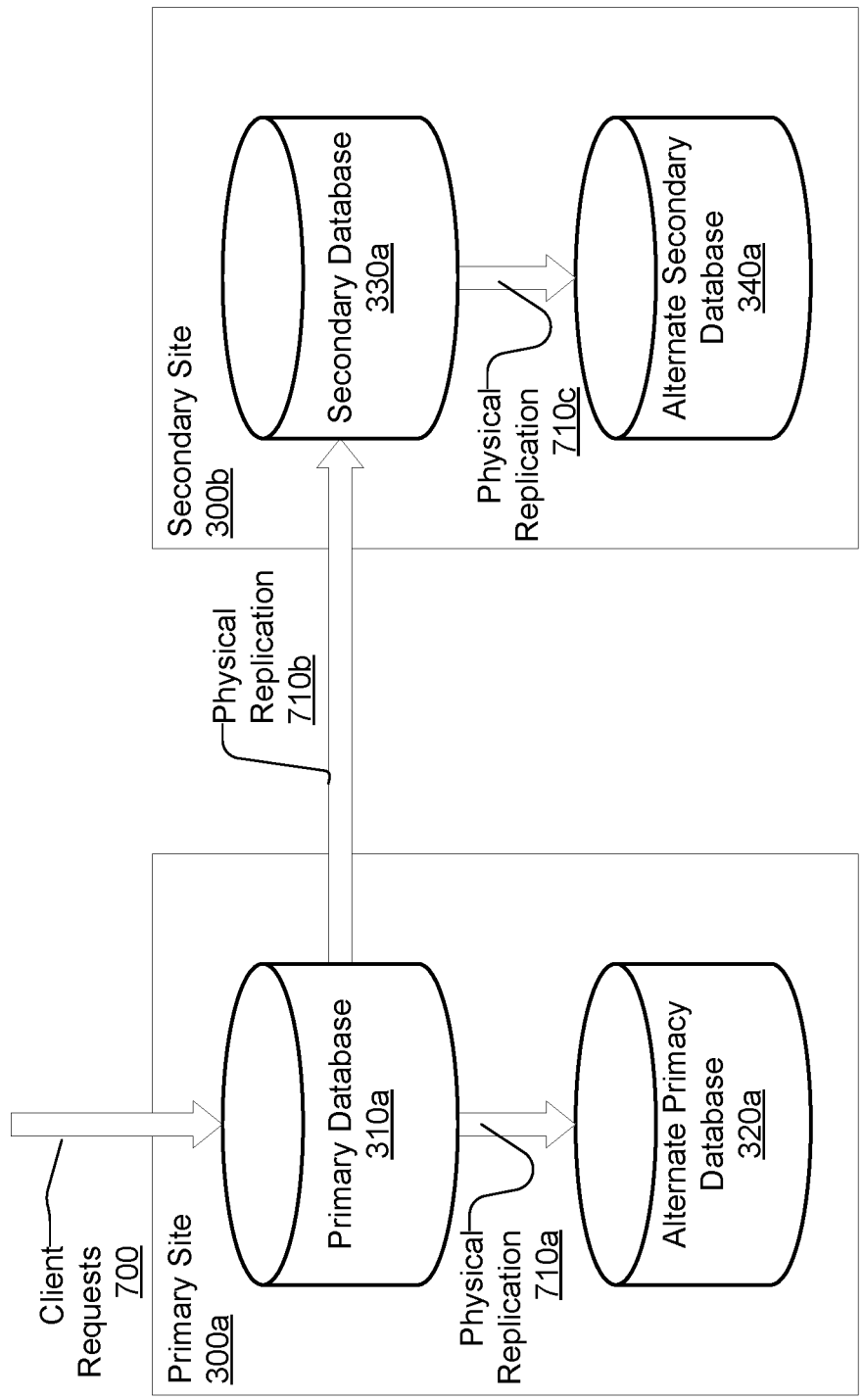
FIGS. 7A-H illustrate various steps of a database upgrade for an online system, according to one embodiment.

The database system 150 receives 510 client requests 700 at the primary database 310a. The databases at the secondary site act as standby databases. As illustrated in FIG. 7H, the changes to the primary database are replicated 710b to secondary database 330a using physical replication. The changes to the primary database are also replicated 710a to the alternate primary database 320a using physical replication. The change to the secondary database 330a are replicated 710c to the alternate secondary database 340a using physical replication. The online system 110 may have several databases that are similar to primary database 310a at a particular site and are replicated across the same site as well as across other sites using a configuration similar to that shown in FIG. 7A. The databases 310a, 320a, 330a, and 340a all have a current version, for example, version V1.

Figure 6:
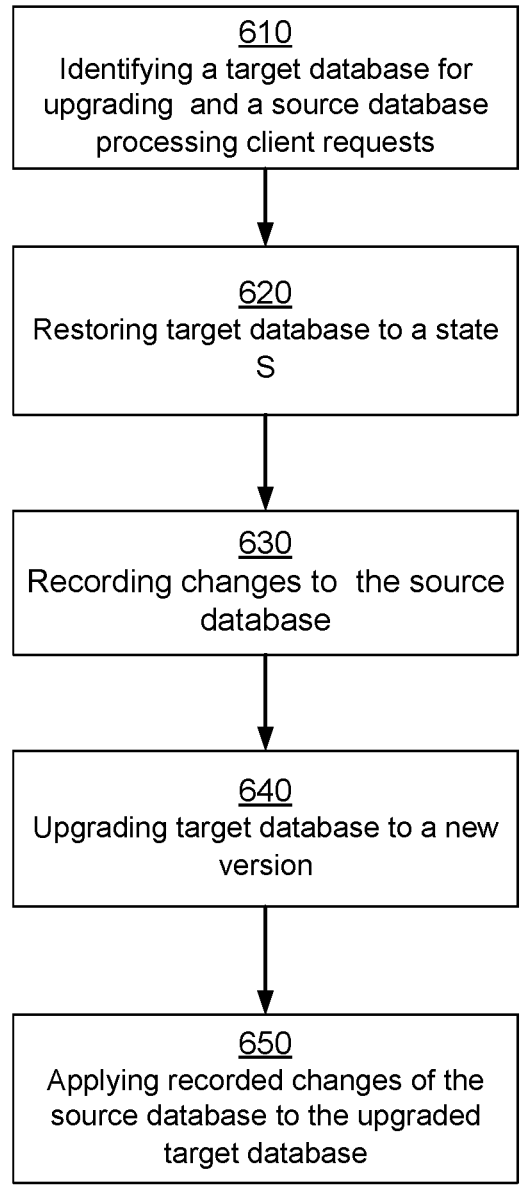
FIG. 6 is a flow chart illustrating the process for upgrading a particular database, according to one embodiment.

The database system 150 receives a request to upgrade the databases to a new version, for example, version V2. The details of the upgrade process for a particular database are illustrated in FIG. 6. The database system 150 starts by upgrading the databases of a secondary site, i.e., any site that is not processing client requests and is used for standby purposes. The database system 150 selects a database from the set of databases of the secondary site for upgrade. In an embodiment, the database system 150 first selects the alternate secondary database 340b for upgrade and upgrades 520 the alternate secondary database 340a to obtain the upgraded alternate secondary database 340b.

The database system 150 may build a tree representation of the databases where each node represents a database and an edge exists between a node representing a database D1 and a node representing a database D2 if the data of database D1 is replicated to database D2. The database system 150 upgrades databases of a site in an order that starts from leaf nodes of such a tree and traverses up the tree towards the root node. Accordingly, the database system 150 starts by upgrading the database that is not being replicated to any other database and is the destination of replication from another database. Accordingly, the database system 150 upgrades a leaf node and then upgrades a parent of the leaf node. The database system 150 reverses the direction of replication between the database corresponding to the leaf node and the database corresponding to the parent of leaf node by replicating changes to the database corresponding to the leaf node to the database corresponding to the parent of the leaf node.

Figure 7B:
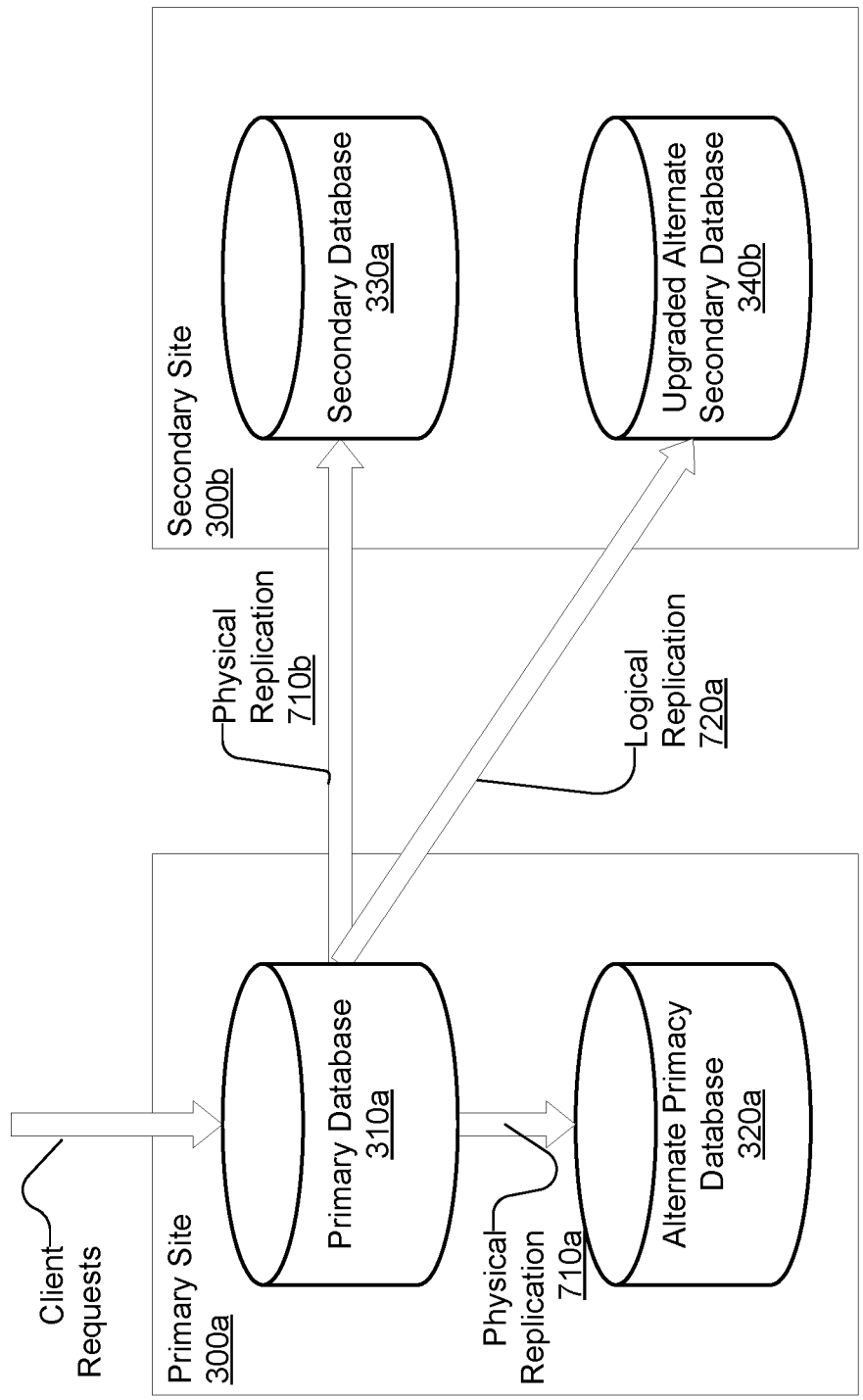

FIG. 7B illustrates a configuration in which the alternate secondary database 340a has been upgraded to the new version to obtain the upgraded alternate secondary database 340b. The database system 150 also continues physical replication 710b from the primary database 310a to the secondary database 330a. The database system 150 stops physical replication 710c from the secondary database 330a to the alternate secondary database 340a. The database system 150 starts logical replication 720a from the primary database 310a to the upgraded alternate secondary database 340b. The database system 150 performs logical replication 720a instead of physical replication from the primary database 310a to the upgraded alternate secondary database 340b since the versions of the two databases are different.

Figure 7C:
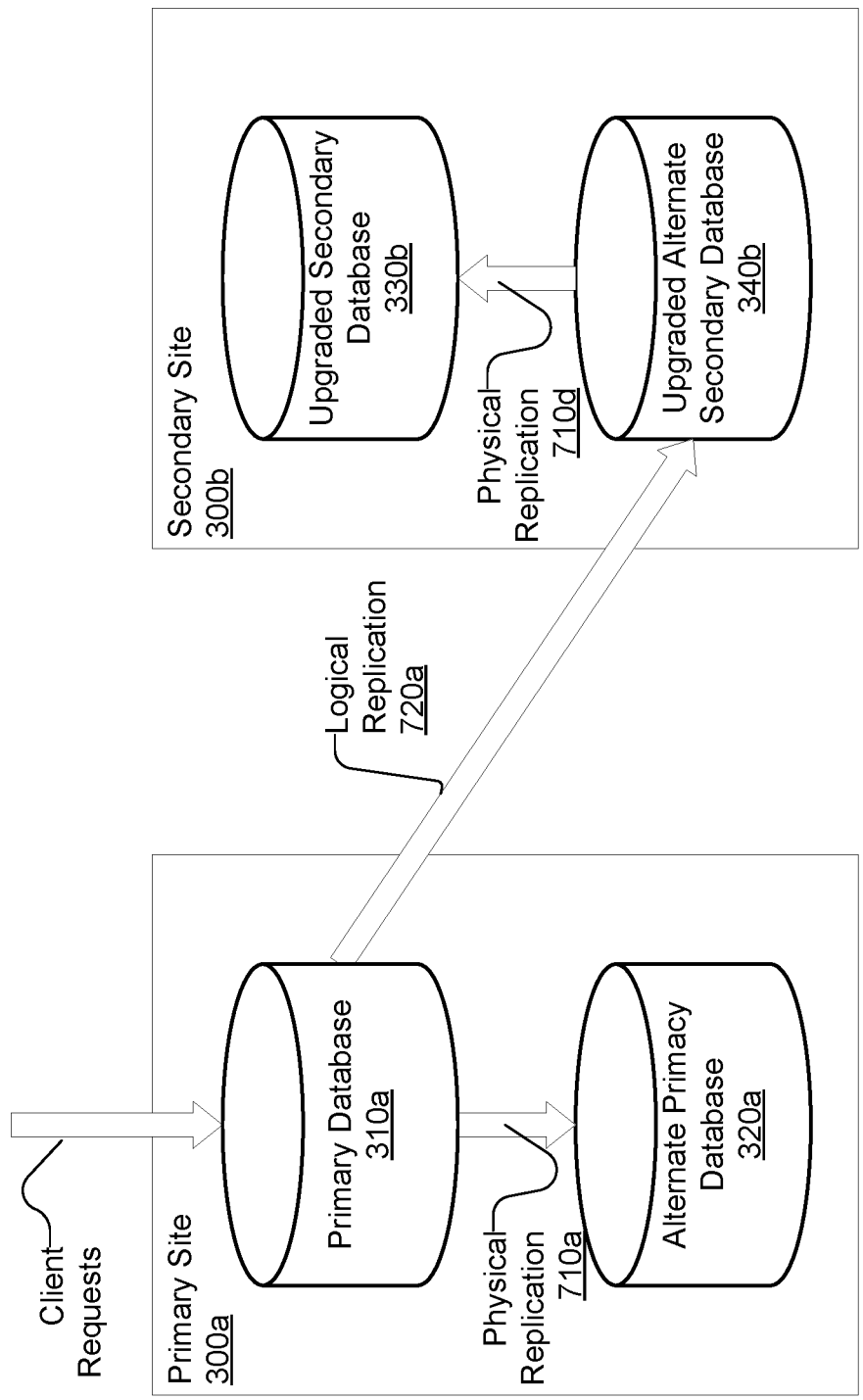

The database system 150 next selects the secondary database 330a for upgrade and upgrades 530 the secondary database 330a to obtain the upgraded secondary database 330b. FIG. 7C illustrates a configuration in which the alternate secondary database 340a has been upgraded to the new version to obtain the upgraded alternate secondary database 340b. As shown in FIG. 7C, the database system 150 continues logical replication 720a from the primary database 310a to the upgraded alternate secondary database 340b. The database system 150 stops physical replication 710b from the primary database 310a to the secondary database 330a. The database system 150 starts physical replication 710d from the alternate secondary database 340b to the secondary database 330b.

Figure 7D:
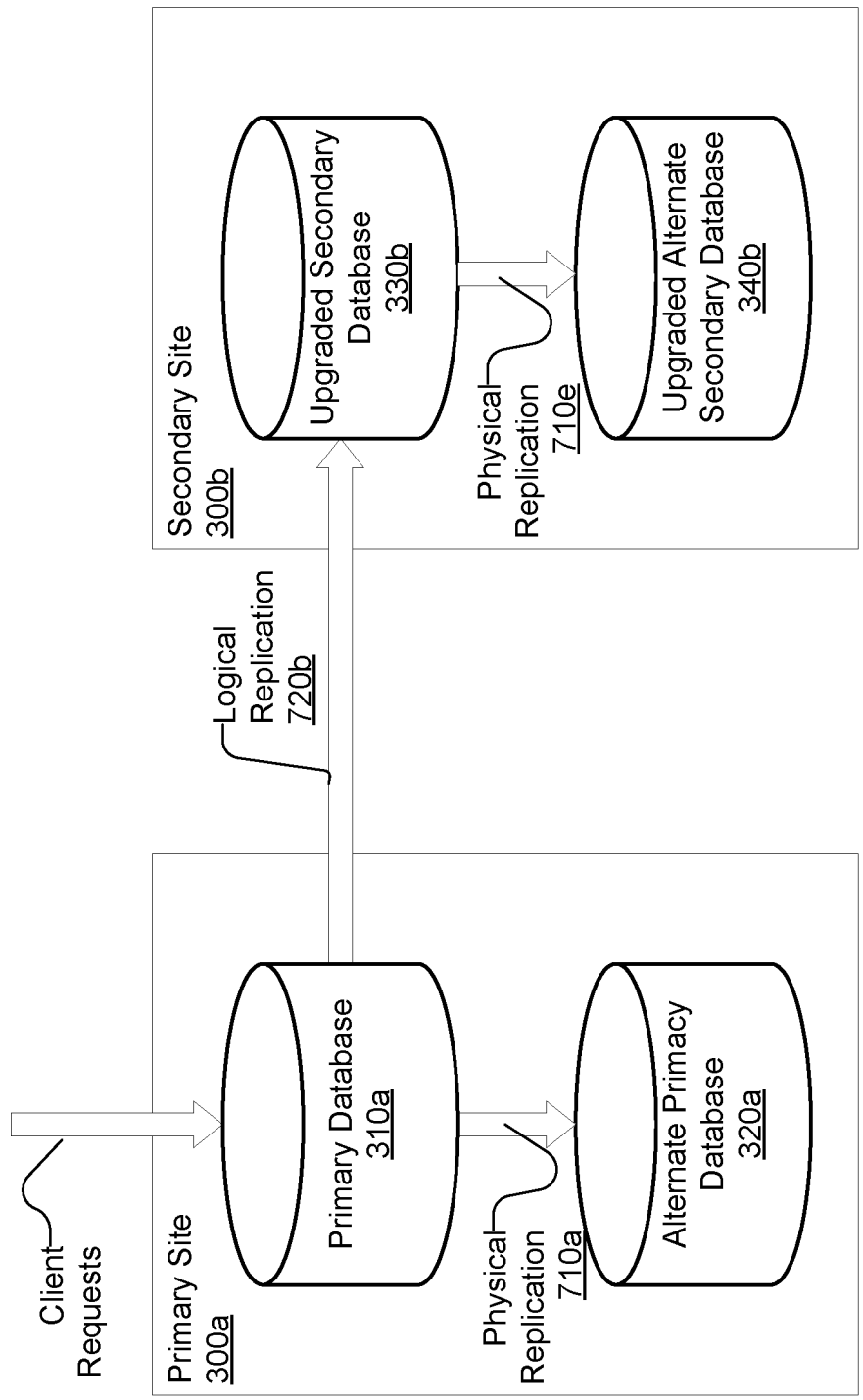

In an embodiment, the database system starts performing logical replication 720b from the primary database 310a to the upgraded secondary database 330b as illustrated in FIG. 7D. The database system starts performing physical replication 710e from upgraded secondary database 330b to the upgraded alternate secondary database 340b. The physical replications 710a continues as shown in FIG. 7C.

Figure 7E:
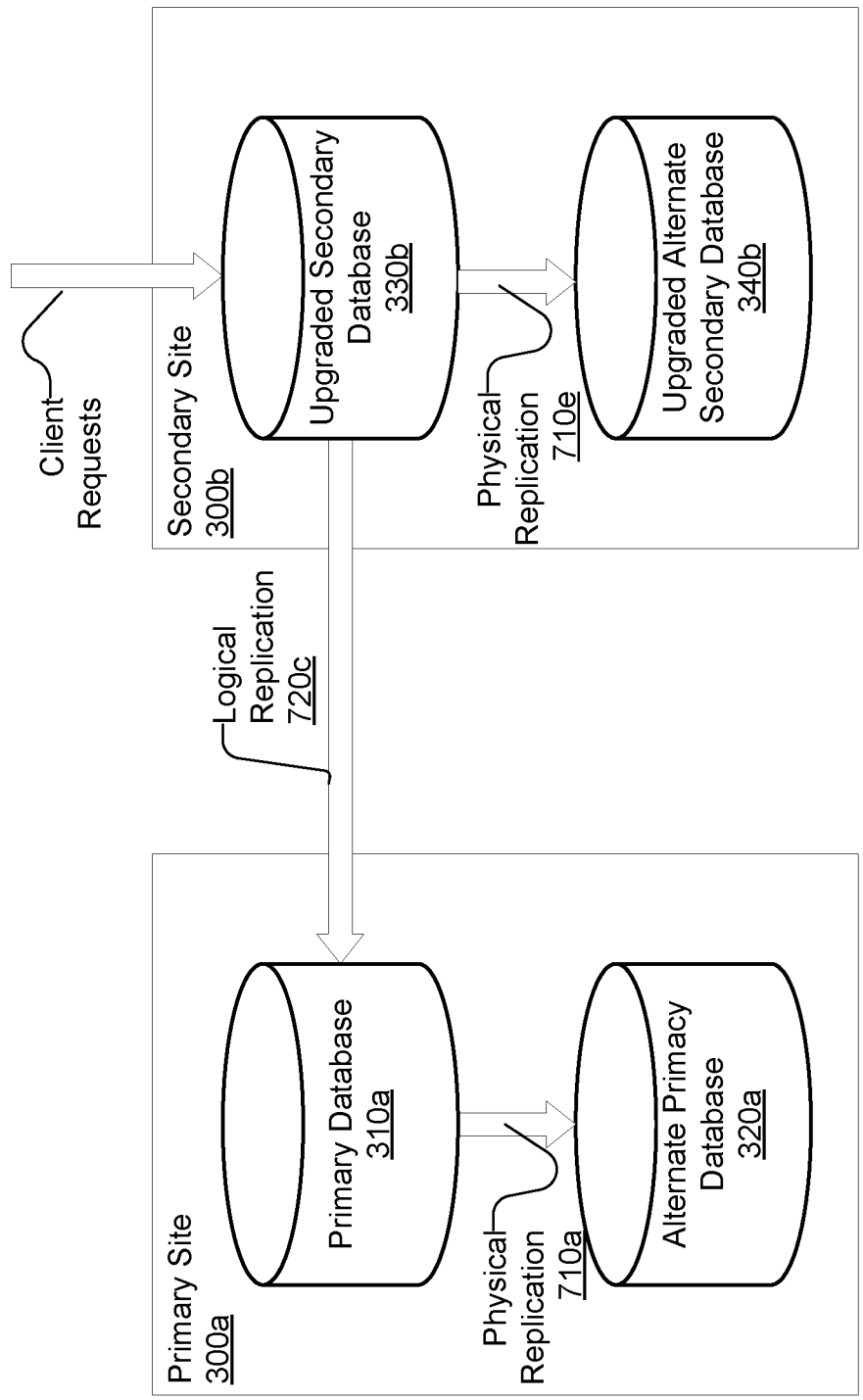

The database system 150 switches 540 client requests 700 from primary site 300a to the secondary site 300b. Accordingly, all client requests 700 are sent to a database selected from the set of databases of the secondary site 300b. In an embodiment, the client requests 700 are now being processed by the upgraded secondary database 330b as shown in FIG. 7E. As shown in FIG. 7E, logical replication 720c is performed from the upgraded secondary database 330b to primary database 310a. The physical replications 710a and 710e continue as illustrated in FIG. 7D.

Figure 7F:
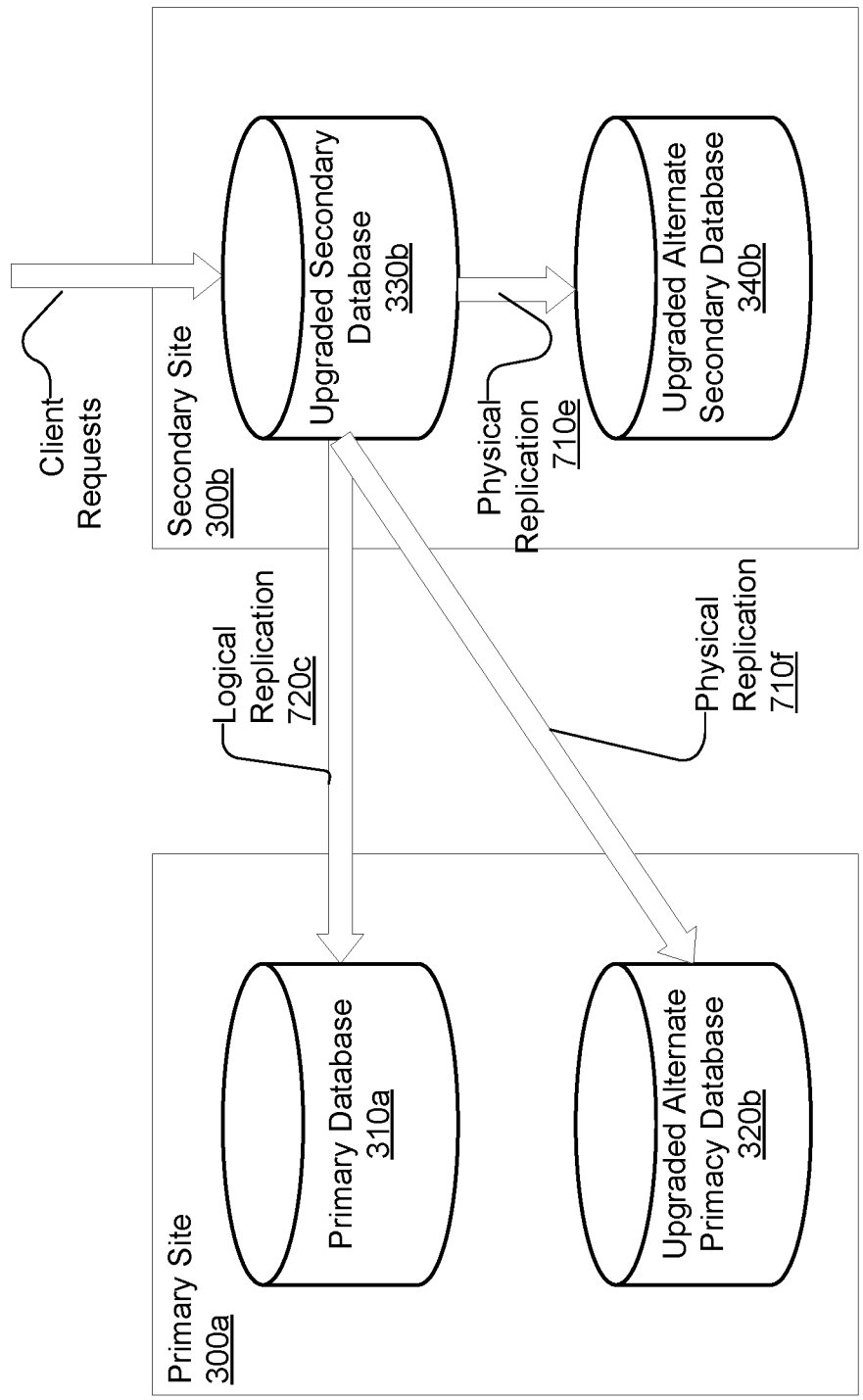

The database system 150 upgrades 550 the alternate primary database 320a to obtain the upgraded alternate primary database 320b as illustrated in FIG. 7F. As shown in FIG. 7F, before upgrading the alternate primary database 320a, the database system 150 stops the physical replication 710a from the primary database 310a to the alternate primary database 320a. As shown in FIG. 7F, the database system 150 continues logical replication 720c from upgraded secondary database 330b to the primary database 720c. The database system 150 starts physical replication 710f from the upgraded secondary database 330b to the upgraded alternate primary database 320b.

Figure 7G:
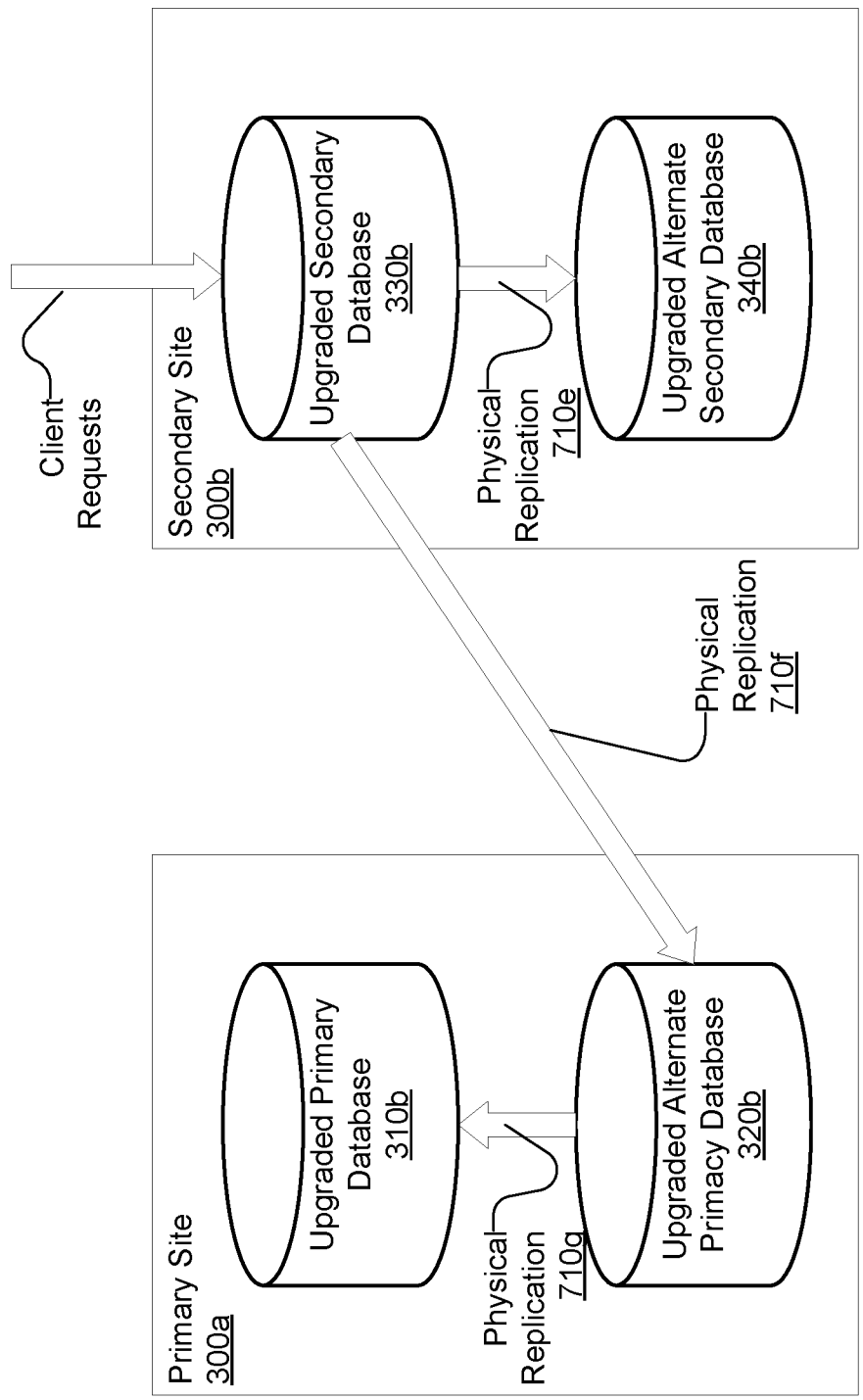
Figure 7H:
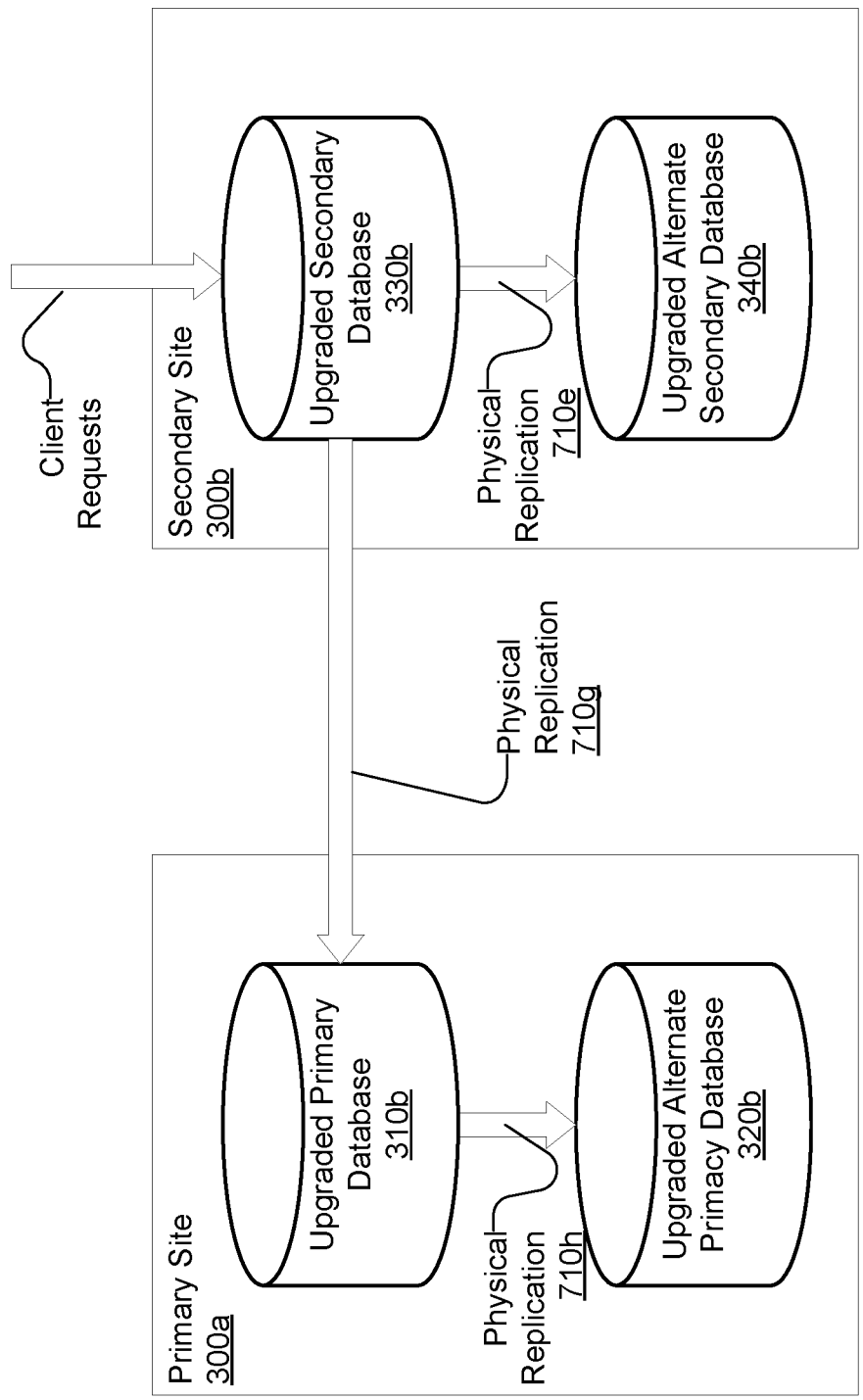

The database system 150 upgrades 560 the primary database 310a to obtain the upgraded primary database 310b as illustrated in FIG. 7G. As illustrated in FIG. 7G, the database system 150 continues the physical replication 710f The database system 150 starts the physical replication 710g from upgraded alternate primary database 320b to the upgraded primary database 310b. The database system 150 continues the physical replication 710e as shown in FIG. 7F.

At this stage all databases are upgraded to the new version. The database system starts performing 570 physical replication 710g from upgraded secondary database 330b to the upgraded primary database 310b. The database system 150 continues the physical replication 710e as shown in FIG. 7G. The database system 150 starts physical replication 710h from the updated primary database 310b to the upgraded alternate primary database 320b as shown in FIG. 7F. The configuration shown in FIG. 7H mirrors the configuration shown in FIG. 7A except that the client requests are processed by the upgraded secondary database 330b and the physical replication 710g is performed from the upgraded secondary database 330b to the upgraded primary database 310b.

In an embodiment, the database system may switch client requests to the primary site 300a again to obtain a configuration matching FIG. 7A.

FIG. 6 is a flow chart illustrating the process for upgrading a particular database, according to one embodiment. The database system 150 upgrades a database to a new version by upgrading the binary files that stores instructions as well as the data. For example, a new version of data may store data using a different format, or use metadata that is different from the metadata of the previous version. The database system 150 executes upgrade instructions, for example, an upgrade script that modifies the data and metadata to conform to the new version.

The database system 150 identifies a target database for upgrading and a source database that is processing client requests. For example, as illustrated in FIG. 7B, for upgrading he alternate secondary database 340a, the database system 150 identifies the target database as the alternate secondary database 340a and the source database as the primary database 310a that is processing the client requests. Similarly, in FIG. 7E, for upgrading the alternate primary database 320a, the database system 150 identifies the target database as the alternate primary database 320a and the source database as the secondary database 330b that is processing the client requests.

The database system 150 identifies a state S of the target database and restores 620 of the state of the target database to state S. In an embodiment, the state S is selected as a recent consistent state of the target database. The restore operation may be performed by the database restore module 250. The source system has a state S' corresponding to state S. The database system records 630 all changes made to the source database from state S' onwards. These changes may be stored by the change monitoring module 260 as change logs. The database system 150 shuts down the target database system and upgrades the target database system to the new version. The database system 150 applies all recorded 630 changes to the upgraded target database to bring the state of the target database to a state close to the latest state of the source database system.

Figure 8:
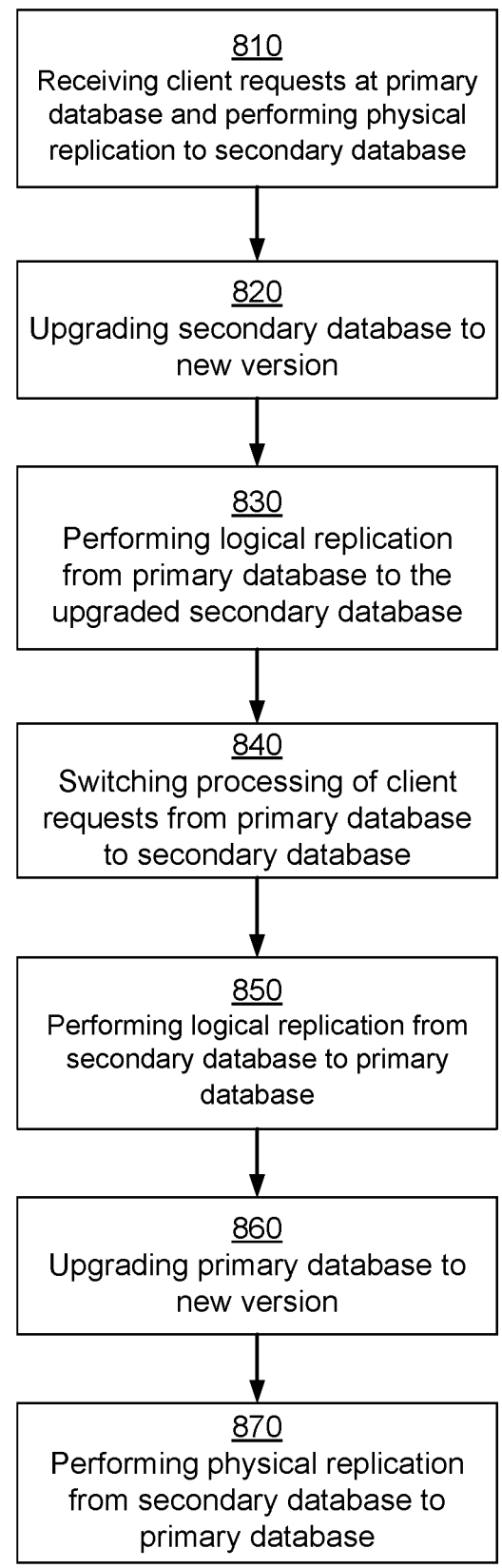
FIG. 8 is a flow chart illustrating the process for performing a database upgrade for the online system, according to another embodiment.

FIG. 8 is a flow chart illustrating the process for performing a database upgrade for the online system, according to another embodiment. The database system 150 is configured as shown in FIG. 5 such that each site 300 has a database, the primary site 300a comprising a primary database 410 and he secondary site comprising a secondary database 420. The database system receives 810 client requests at the primary database 410. The database system 150 performs physical replication from the primary database 410 to the secondary database 420.

The database system 150 receives a request to upgrade the databases. The database system 150 upgrades 820 the secondary database 420 to obtain an upgraded secondary database. The database system 150 upgrades 820 the secondary database 420a using the process described in FIG. 6 wherein the source database is the primary database 410 and the target database is the secondary database 420. The database system 150 performs logical replication from the primary database to the upgraded secondary database. The database system 150 switches the processing of the client requests from the primary site to the secondary site. More specifically the database system 150 switches the processing of the client requests from the primary database to the upgraded secondary database. After switching the client requests to the secondary database, the database system 150 performs logical replication from the upgraded secondary database to the primary database. The database system 150 upgrades the primary database to an upgraded primary database using the process illustrated in FIG. 6 wherein the source database is the upgraded secondary database and the target database is the primary database. The database system 150 starts physical replication from the upgraded secondary database to the upgraded primary database. In an embodiment, the database system 150 may switch the client requests back to the primary site to have a configuration similar to that shown in FIG. 6 except for the primary and secondary databases being upgraded.

Computer Architecture

Figure 9:
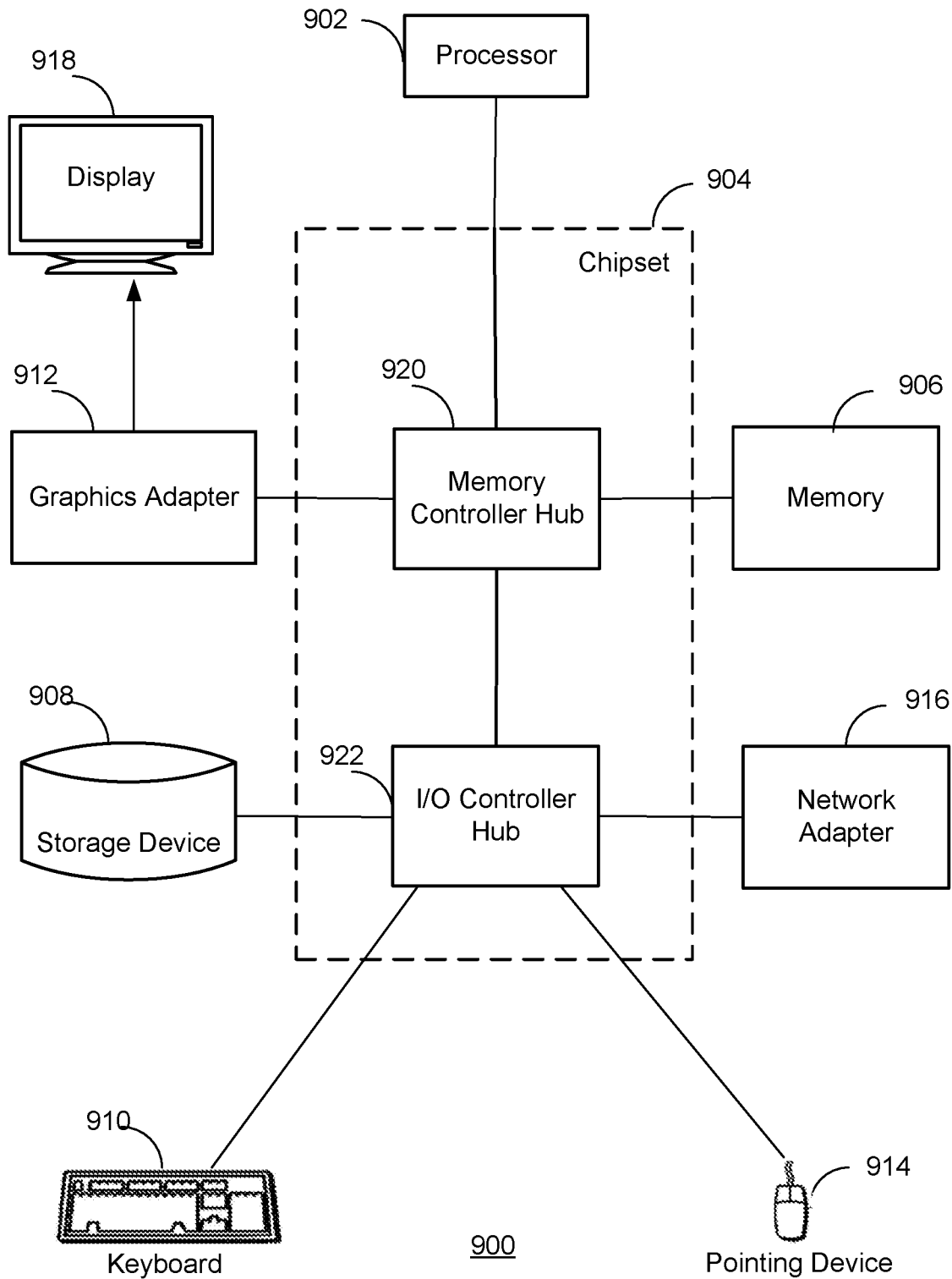
FIG. 9 is a block diagram illustrating a functional view of a typical computer system for use in the environment of FIG. 1 according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 200. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as an online system 110 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 104 may be a mobile phone with limited processing power, a small display 918, and may lack a pointing device 914. The online system 110 in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method for upgrading databases, comprising:
   storing, by an online system, data in (1) a primary site comprising a primary set of databases processing client requests, the primary set of databases comprising a primary database and an alternate primary database that is a physical replication of the primary database, and (2) a secondary site comprising a secondary set of databases used as standby databases, the secondary set of databases comprising a secondary database and an alternate secondary database that is a physical replication of the secondary database;
   upgrading the secondary site, comprising:
      upgrading the alternate secondary database to an upgraded alternate secondary database;
      after the upgrading of the alternate secondary database, applying recorded changes of the primary database of the primary set to the upgraded alternate secondary database, causing the upgraded alternate secondary database to be a logical replication of the primary database;
      upgrading the secondary database to an upgraded secondary database, causing the secondary database to be a physical replication of the upgraded alternate secondary database;
   after upgrading the secondary site, switching client requests to the secondary set of databases and using the primary set of databases as standby databases;
   upgrading the primary site, comprising:
      upgrading the alternate primary database to an upgraded alternate primary database, causing the upgraded alternate primary database to be a physical replication of the upgraded secondary database; and
      upgrading the primary database to an upgraded primary database, causing the upgraded primary database to be a physical replication of the upgraded alternate primary database.

2. The method of claim 1, wherein the primary and secondary sites represent respective physical locations.

3. The method of claim 1, wherein responsive to switching client requests to the secondary set of databases, client requests are directed to the secondary database and changes to the secondary database are replicated to a database of the primary set of databases using a logical replication platform.

4. The method of claim 1, wherein before upgrading databases of the secondary set of databases, client requests are directed to the primary database and changes to the primary database are replicated to a database of the secondary set of databases using physical replication that performs storage block level replication.

5. The method of claim 1, wherein after upgrading databases of the secondary site, client requests are directed to the secondary databases and changes to the secondary database are replicated to a database of the primary set of databases using physical replication.

6. The method of claim 1, wherein the online system is a multi-tenant system and each database from the primary set of databases and the secondary set of databases stores data of a plurality of tenants.

7. The method of claim 1, wherein replication is used to copy data across databases within each set of the primary and secondary sets of databases.

8. The method of claim 1, wherein, after the upgrading of the secondary database, the method further comprising:
   upgrading one or more other databases from the secondary set of databases of the secondary site; and
   wherein the switching of client requests to the secondary set of databases comprises directing client requests to the secondary database.

9. The method of claim 1, wherein the switching of client requests to the secondary set of databases comprises directing client requests to the secondary database.

10. A non-transitory computer readable storage medium for storing instructions that when executed by a computer processor cause the computer processor to perform steps comprising:
   storing, by an online system, data in (1) a primary site comprising a primary set of databases processing client requests, the primary set of databases comprising a primary database and an alternate primary database that is a physical replication of the primary database, and (2) a secondary site comprising a secondary set of databases used as standby databases, the secondary set of databases comprising a secondary database and an alternate secondary database that is a physical replication of the secondary database;
   upgrading the secondary site, comprising:
      upgrading the alternate secondary database to an upgraded alternate secondary database; and
      after the upgrading of the alternate secondary database, applying recorded changes of the primary database of the primary set to the upgraded alternate secondary database, causing the upgraded alternate secondary database to be a logical replication of the primary database;
      upgrading the secondary database to an upgraded secondary database, causing the secondary database to be a physical replication of the upgraded alternate secondary database;
   after upgrading the secondary site, switching client requests to the secondary set of databases and using the primary set of databases as standby databases;
   upgrading the primary site, comprising:
      upgrading the alternate primary database to an upgraded alternate primary database, causing the upgraded alternate primary database to be a physical replication of the upgraded secondary database; and
      upgrading the primary database to an upgraded primary database, causing the upgraded primary database to be a physical replication of the upgraded alternate primary database.

11. The non-transitory computer readable storage medium of claim 10, wherein the primary and secondary sites represent respective physical locations.

12. The non-transitory computer readable storage medium of claim 10, wherein responsive to switching client requests to the secondary set of databases, client requests are directed to the secondary database and changes to the secondary database are replicated to a database of the primary set of databases using a logical replication platform.

13. The non-transitory computer readable storage medium of claim 10, wherein before upgrading databases of the secondary set of databases, client requests are directed to the primary database and changes to the primary database are replicated to a database of the secondary set of databases using physical replication that performs storage block level replication.

14. The non-transitory computer readable storage medium of claim 10, wherein after upgrading database of the secondary site, client requests are directed to the secondary database and changes to the secondary database are replicated to a database of the primary set of databases using physical replication.

15. The non-transitory computer readable storage medium of claim 10, wherein replication is used to copy data across databases within each set of the primary and secondary sets of databases.

16. The non-transitory computer readable storage medium of claim 10, wherein the steps further comprise, after the upgrading of the secondary database:
   upgrading one or more other databases from the secondary set of databases of the secondary site; and
   wherein the switching of client requests to the secondary set of databases comprises directing client requests to the secondary database.

17. The non-transitory computer readable storage medium of claim 10, wherein the switching of client requests to the secondary set of databases comprises directing client requests to the secondary database.

18. A computer system comprising:
   a computer processor; and
   a non-transitory computer readable storage medium for storing instructions that when executed by a computer processor cause the computer processor to perform steps comprising:
   storing, by an online system, data in (1) a primary site comprising a primary set of databases processing client requests, the primary set of databases comprising a primary database and an alternate primary database that is a physical replication of the primary database, and (2) a secondary site comprising a secondary set of databases used as standby databases, the secondary set of databases comprising a secondary database and an alternate secondary database that is a physical replication of the secondary database;
   upgrading the secondary site, comprising:
      upgrading the alternate secondary database to an upgraded alternate secondary database;
      after the upgrading of the alternate secondary database, applying recorded changes of the primary database of the primary set to the upgraded alternate secondary database, causing the upgraded alternate secondary database to be a logical replication of the primary database;
      upgrading the secondary database to an upgraded secondary database, causing the secondary database to be a physical replication of the upgraded alternate secondary database;
   after upgrading the secondary site, switching client requests to the secondary set of databases and using the primary set of databases as standby databases;
   upgrading the primary site, comprising:
      upgrading the alternate primary database to an upgraded alternate primary database, causing the upgraded alternate primary database to be a physical replication of the upgraded secondary database; and upgrading the primary database to an upgraded primary database, causing the upgraded primary database to be a physical replication of the upgraded alternate primary database.

* * * * *

UNITED STATES PATENT AND TRADEMARK OFFICE
CERTIFICATE OF CORRECTION

| | | |
|---|---|---|
| PATENT NO. | : 12,050,618 B2 | |
| APPLICATION NO. | : 16/880965 | |
| DATED | : July 30, 2024 | |
| INVENTOR(S) | : Sheng Qiao et al. | |

It is certified that error appears in the above-identified patent and that said Letters Patent is hereby corrected as shown below:

In the Claims

In Column 13 (Claim 5), Line 1, please delete "secondary databases" and insert -- secondary database --.

Signed and Sealed this
Third Day of September, 2024

Katherine Kelly Vidal
*Director of the United States Patent and Trademark Office*